Patented June 27, 1933

1,915,603

UNITED STATES PATENT OFFICE

FRED J. GOUGH, OF FORT DODGE, IOWA, ASSIGNOR TO UNITED STATES GYPSUM COMPANY, OF CHICAGO, ILLINOIS, A CORPORATION OF ILLINOIS

PROCESS OF MAKING PLASTER BOARD

No Drawing.   Application filed October 16, 1930. Serial No. 489,237.

This invention relates to processes of making gypsum board and has reference more particularly to the process of the class described in which the initial and final set of the plastic core material is accurately controlled through the proper use of retarding and accelerating agents.

In the manufacture of gypsum board, such as wallboard and plaster board, it is customary to introduce a plastic material composed mainly of calcined gypsum and water, but containing other ingredients in minor proportion, between the upper and lower cover sheets of paper which are to form the outer faces of the gypsum board. The general process of forming gypsum board of this nature is disclosed in Utzman Patent No. 1,330,413 of February 10, 1920. This process described in the Utzman patent has been modified more recently in that a lightweight foam is mixed with the plastic material before it is introduced between the paper cover sheets so as to reduce the density of the core in the finished gypsum board. This process of adding foam to the plastic mixture is more fully disclosed in the Roos Canadian Patent No. 296,936 of January 21, 1930.

In carrying out the gypsum board manufacturing process, it is standard practice to accelerate the setting time of the plastic mixture by adding thereto a measured quantity of ground, dry, gypsum block which is composed of calcium sulphate dihydrate. This accelerating material is uniformly mixed with the plastic material and furnishes the seed crystals which accelerate or hasten the hydration of the calcined gypsum by the water in the mixture. A moderately quick setting calcined gypsum will have a setting time of 20 to 24 minutes, but the addition of the accelerator gives the plastic mixture in initial set of 2 minutes and a final set of 8 to 10 minutes so that the board is hard enough to be manipulated when it reaches the cutting knife. Some types of calcined gypsum are naturally quick setting and the calcined gypsum may start to set before it has been rolled out flat by the master roll so that the resulting boards have lumps and voids and the foam is broken down thus producing a too high density of the core material. Due to this abnormal quick setting characteristic, the resulting boards are apt to be "peelers", that is, the paper cover sheets have a poor bond with the core material. This trouble will also produce poor, weak boards of low quality.

An object of this invention, therefore, is to provide a process of so regulating the initial and final sets of the plastic mixture as to reduce the number of set lumps in the mix and also the number of voids in the gypsum board.

Another object of the invention is to produce gypsum boards having a good bond between the core material and the paper cover sheets and to produce strong boards of high quality; also to improve gypsum boards and their process of manufacture in other respects hereinafter specified and claimed.

I have discovered that by adding commercial retarder to the plastic mixture to be formed into the core of the gypsum board, the time of initial set of the calcined gypsum will be lengthened so that the plastic mixture will pass the master roll without setting. This addition of retarder, however, does not appreciably lengthen the time of the final set so that the formed board is hard enough to be successfully operated upon by the cut-off knife. This addition of retarder is preferably accompanied with an addition of accelerator so that both retarder and accelerator are added to the plastic mixture before the mixture passes the master or head roll of the board machine. I preferably add the retarder first to the plastic mixture before the soaking period. The retarder is very rapid in producing its retarding effect on the setting time of the calcined gypsum so that any initial setting of the mixture before it passes the head roll is prevented. The accelerator is preferably added to the mixture after the calcined gypsum has gone through the soaking period so that a time interval of 30 to 40 seconds intervenes between the addition of the retarder and the accelerator. The accelerator is rather slow to start its accelerating action so that its influence is not felt until after the plastic mixture passes the head roll. Thus it is seen that the retarder prevents any set of the plastic mixture before the board core is formed and then the accelerator gets into action and gives the core material a quick final set. For certain classes of calcined gypsum which are normally quick setting, the addition of accelerator will not be necessary.

The retarder may be mixed or dissolved in the foam solution prior to whipping the solution into foam. As retarder solution is very colloidal and a thoroughly efficient foaming agent, its use in conjunction with the regular foaming solution is entirely satisfactory, and in fact, may in a small measure improve the character of the foam produced. The incorporation of the retarder in the foam solution is a very convenient way for making the addition to the plastic mixture, as the foam solution is added in very definite increments and, therefore, the retardation is accurately regulated. If desired, however, the retarder may be added to the gauging water used for mixing with the calcined gypsum and a similar effect produced, although when added in this fashion, it tends to lengthen the final set slightly more than when the addition is made to the foam solution. The retarder may also be added in a dry form, properly mixed or blended with the dry calcined gypsum or with the paste of dextrine or other starch products, which are normally added as a minor ingredient in the core mixture to give a better bond with the paper cover sheets. These methods of adding the retarder to the dry calcined gypsum or to the dry paste are not as desirable as the addition to the foam solution, since it is more difficult to control the uniformity of the resulting gypsum board. If the retarder is added to the foam solution, rather than to the gauging water, some seed crystals are allowed to form during the soaking period before the retarder is added to the mixture, and under these conditions, the initial set is slowed up by the retarder addition but the final set is not materially affected. Where the retarder is added to the gauging water, the wetting of the calcined gypsum by the water is facilitated due to the presence of the retarder so that the soaking operation is more efficient. It is thus seen that of the four mentioned methods of adding the retarder, the one to be selected is the one desired by the operator to suit the particular conditions or circumstances connected with the nature of the calcined gypsum or the operating conditions of the board machine.

The amount of retarder required to accomplish the desired effect is relatively small and, of course, depends upon the time of set of the calcined gypsum as it comes from the calciner. Ordinarily 2 to 4 ounces of retarder per thousand feet of 3/8" board is sufficient, but with exceptionally quick setting calcined gypsum, it is necessary at times to increase this slightly. At times it may be necessary to add as much as 16 ounces of retarder per thouand square feet of board. A plastic mixture treated according to my improved process by the addition of retarder and at times accelerator, will have an initial set of about 4 to 5 minutes with a final set of about 8 to 10 minutes.

The retarder added in the improved process is preferably of the commercial type well known to the art and consists of organic materials such as hair, etc., dissolved in caustic soda and containing lime in excess. However, powdered glue, borax or sodium citrate, as well as other retardative materials may be used instead of commercial retarder.

I have found that the above described improved process effectively prevents troubles due to premature setting of the mix, the inclusion of voids in the core, the breaking down of the foam and the production of peelers or other boards of poor quality. In addition to the above described advantages, I have found that the combined addition of accelerator with the retarder increases the strength of the resulting core material even above that of the strength of the neat or unaccelerated—unretarded mixture. The closer the addition of retarder is to the initial set of the plastic mixture, the less the amount of accelerator which is needed to give a certain final set. I have also found that the greater the time interval between the addition of the retarder and the addition of the accelerator, the greater will be the compressive strength of the resulting core composition, as shown by the following table:—

| Interval between the beginning of soaking and accelerator addition—minutes | Percentage accelerator based on dry calcined gypsum | Set of plastic mixture—minutes | Compressive strength, pounds per square inch |
|---|---|---|---|
| 9 | 1.5 | 10.0 | 825 |
| 25 | 1.0 | 11.5 | 950 |
| 42 | 0.66 | 12.0 | 1,000 |
| 58 | 0.3 | 15.5 | 1,000 |

I would state in conclusion that while the examples described constitute a practical embodiment of my invention, I do not wish to limit myself precisely to these details, since manifestly the same may be considerably varied without departing from the spirit of the invention as defined in the appended claims.

Having thus described my invention, I claim as new and desire to secure by Letters Patent:

1. The process of preparing a plastic mixture for the core of gypsum board, which comprises mixing a retarder with a plastic mixture containing calcined gypsum and water, and after a predetermined interval, mixing an accelerator with said plastic mixture.

2. The process of preparing a plastic mixture for the core of gypsum board, which comprises adding at spaced intervals retarder and accelerator in the order named to a plastic mixture comprising calcined gypsum and water.

3. The process of preparing a plastic mixture for the core of gypsum boards, which comprises adding at spaced intervals 2 to 16 ounces of retarder per thousand square feet of ⅜" gypsum board and 0.3 to 1.5% of accelerator based on the dry, calcined gypsum to the plastic mixture of calcined gypsum and water prior to the introduction of said mixture between the paper cover sheets of the board.

4. The process of preparing gypsum board core material, which comprises adding a solution of retarder to a freshly prepared mixture of calcined gypsum and water, after a spaced interval and after thorough mixing, mixing dry, powdered accelerator to the mixture, and quickly forming the mixture between the board cover sheets to form a quick setting gypsum board.

5. The process of preparing gypsum board core material, which comprises adding retarder to dry calcined gypsum, mixing water with the mixture, after a predetermined period mixing dry accelerator with the mixture, and promptly forming the mixture between the board cover sheets to form a quick setting gypsum board.

FRED J. GOUGH.